США007110185B2

United States Patent
Saori (10) Patent No.: US 7,110,185 B2
(45) Date of Patent: Sep. 19, 2006

(54) IMAGE PICKUP APPARATUS (75) Inventor: Masakazu Saori, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 11/213,768

(22) Filed: Aug. 30, 2005

(65) Prior Publication Data
US 2006/0056046 A1 Mar. 16, 2006

(30) Foreign Application Priority Data
Aug. 31, 2004 (JP) ............................ 2004-253385

(51) Int. Cl.
G02B 1/06 (2006.01)
G02B 15/14 (2006.01)
G03B 17/00 (2006.01)

(52) U.S. Cl. .................. 359/666; 359/676; 396/60; 396/72

(58) Field of Classification Search ........... 359/666, 359/676, 697–698; 396/60, 72, 311; 348/231.3, 348/231.99, 239, 240.1, 207.99
See application file for complete search history.

(56) References Cited

U.S. PATENT DOCUMENTS 6,344,930 B1 * 2/2002 Kaneko et al. ............. 359/666
6,496,655 B1 * 12/2002 Malloy Desormeaux .... 396/311
2002/0118964 A1 * 8/2002 Enomoto .................... 396/60
2006/0056063 A1 * 3/2006 Saori et al. ................. 359/721

FOREIGN PATENT DOCUMENTS

JP 10-206732 8/1998
JP 2002-244030 8/2002

OTHER PUBLICATIONS

English Language Abstract of JP 2002-244030.

* cited by examiner

Primary Examiner—Ricky Mack
Assistant Examiner—M. Hasan
(74) Attorney, Agent, or Firm—Greenblum & Bernstein, P.L.C.

(57) ABSTRACT

An image pickup apparatus includes a multifocal optical system in which first and second focal lengths on short and long focal length sides is optically selected; an image pickup device for converting an optical image into an image signal; an image processor which processes the image signal to form an original image; a trimming device for trimming the original image formed by the image processor; a drive controller for switching the optical focal length when the set angle-of-view of the trimming device changes between the second angle-of-view and a third angle-of-view which is smaller than the second angle-of-view; and a memory for storing an original image formed by the image processor at a focal length before the optical focal length is switched by the drive controller. The trimming device forms trimmed images of set angle-of-views while the optical focal length is switched.

9 Claims, 6 Drawing Sheets

IMAGE PICKUP APPARATUS

BACKGROUND OF THE INVENTION

1. Field of the Invention

The present invention relates to an image pickup apparatus mounted to a small information terminal or the like.

2. Description of the Related Art

In recent years, small camera modules have been mounted in compact portable data handsets such as cellular phones and PDAs (Personal Digital Assistant). An optical system for such a small camera module must be small and particularly thin. To this end, in many cases, a unifocal lens system is used for the optical system to reduce thickness and a trimming (digital zooming) function is used to achieve a zooming effect. According to this trimming function, virtual telescopic photography (enlargement photography) can be carried out by trimming the angle-of-view (image capture range). Alternatively, a thin optical zoom lens system which does not utilize a trimming function has been proposed. This known optical zoom lens system is provided with at least one movable lens group which is moved to change the focal length to thereby vary the angle of view.

However, in a trimming system using a unifocal lens system, an optical image formed by the unifocal lens system is converted into a digital image (original image), so that at least a part of the digital image is extracted and enlarged in order to be displayed. Consequently, the enlarged digital image has fewer image pixels than that of the original image (original digital image which has not been enlarged). Therefore, if the extracted image is enlarged to the same size of the original image, the extracted image becomes undesirably rough. The image quality and the magnifying ratio for indicating an enlarged image are interrelated, so that the image quality is significantly reduced as the magnification is increased.

In a trimming system using an optical zoom lens, since it is necessary to provide a lens drive mechanism such as a motor or a cam in order to at least substantially continuously move the movable lens group, the lens drive mechanism tends to be complicated and large. An increase in the size of the optical zoom lens is contrary to the aim of miniaturizing and reducing the weight of the information terminal to which the optical zoom lens is to be mounted. Furthermore, in an optical zoom lens system, the movement of the movable lens group significantly deteriorates the performance due to decentering (eccentricity) thereof or the like. In particular, such deterioration in the optical performance become more apparent as the optical zoom lens system is further miniaturized. In order to solve these problems, it is possible to use a bifocal optical system in which a wide-angle photographing mode and a telephoto mode can be selected. However, in a bifocal optical system, only two focal lengths can be selectively used, and hence, the bifocal optical system is not necessarily satisfactory for a zoom lens system.

To solve the above-mentioned problems, it is possible to combine optical zooming, which is performed by a focus switching optical system, with trimming, which is performed by an image processing operation. However, if an object image at each focal length of the focus switching optical system is used and an object image at an intermediate focal length between the selectable focal lengths of the focus switching optical system is complemented by a trimmed image, a angle-of-view at which the trimmed image cannot be obtained exists when the focal length of the focus switching optical system is changed, so that a continuous zooming effect cannot be obtained.

SUMMARY OF THE INVENTION

The present invention eliminate the drawbacks of the above-described prior art, by providing an image pickup apparatus which is simple in structure, can continuously achieve a zooming effect during a switching of the focal length of the focus switching optical system, and can prevent deterioration of the image quality, while providing a zooming effect substantially the same as that of an optical zoom lens system.

In the present invention, the mechanical structure and the lens structure are simplified by an appropriate combination of a focus switching optical system and a trimming (digital zoom) function, while providing the same zooming effect as a conventional optical zoom lens. In particular, the focus switching timing and an original image to be formed for a trimmed image are determined so as to achieve the zoom effect continuously at the switching of the focal length.

According to the present invention, an image pickup apparatus is provided, including a multifocal optical system in which at least a first focal length on a short focal length side and a second focal length on a long focal length side is optically selected; an image pickup device for converting an optical image formed by the multifocal optical system into an image signal; an image processor which processes the image signal output from the image pickup device, and forms an original image which is defined by an object image of an angle-of-view corresponding to the first and second focal lengths of the multifocal optical system; a trimming device for trimming the original image formed by the image processor to form trimmed images of angle-of-views smaller than first and second angle-of-views which correspond to the first and second focal lengths, respectively; a drive controller for switching the optical focal length of the multifocal optical system when the set angle-of-view of the trimming device changes between the second angle-of-view and a third angle-of-view which is smaller than the second angle-of-view; and a memory for storing an original image formed by the image processor at a focal length before the optical focal length is switched by the drive controller. The trimming device forms trimmed images corresponding to set angle-of-views, using the original image stored in the memory, while the optical focal length of the multifocal optical system is switched.

It is desirable for the trimming device to trim the original image of an angle-of-view corresponding to the first focal length so as to thereby form a trimmed image whose angle-of-view is between the first angle-of-view and an angle-of-view smaller than the second angle-of-view.

If the angle-of-view f2 corresponding to the second focal length of the multifocal optical system is set, a trimmed image of the angle-of-view f1 corresponding to the first focal length is used in place of the object image (without being trimmed) at the second focal length, formed by the image processor.

The multifocal optical system holds the first focal length or the second focal length in the angle-of-view area other than those between the angle-of-views f2 and f5 in which the optical focal length can be changed. Namely, when the set angle-of-view of the trimming device is larger than said second angle-of-view, it is desirable for the multifocal optical system to be maintained at the first focal length, and when the set angle-of-view of the trimming device is smaller than a third angle-of-view which is smaller than the second angle-of-view, it is desirable for the multifocal optical system to be maintained at the second focal length.

While the set angle-of-view of the trimming device increases from the third angle-of-view or an angle-of-view smaller than the third angle-of-view, it is desirable for the memory to store the original image of the second angle-of-view when the set angle-of-view is equal to the third angle-of-view, and for the multifocal optical system to switch from the second focal length to the first focal length via the drive controller while the set angle-of-view is between the third angle-of-view and the second angle-of-view.

During this wide-angle zooming operation, the multifocal optical system switches from the second focal length to the first focal length through the lens drive controller, while the set angle-of-view is between the angle-of-view f5 and angle-of-view f2.

It is desirable for the original image to be replaced with an object image of the first angle-of-view corresponding to the first focal length, and for the trimming device to form a trimmed image corresponding to the set angle-of-view, when a switching of the optical focal length of the multifocal optical system by the drive controller is completed.

While the set angle-of-view of the trimming device is reduced from the second angle-of-view or an angle-of-view larger than the second angle-of-view, it is desirable for the memory to store the original image of the first angle-of-view when the set angle-of-view is equal to the second angle-of-view, and for the multifocal optical system to switch from the first focal length to the second focal length via the drive controller while the set angle-of-view is between the second angle-of-view and the third angle-of-view.

During this telephoto zooming operation, the multifocal optical system switches from the first focal length to the second focal length through the lens drive controller, while the set angle-of-view is between the angle-of-view f2 and angle-of-view f5.

It is desirable for the original image to be replaced with an object image of the second angle-of-view, and for the trimming device to form a trimmed image corresponding to the set angle-of-view, when a switching of the optical focal length of the multifocal optical system by the drive controller is completed.

It is desirable for the drive controller to cause the multifocal optical system to begin switching the focal length when the storage operation of the memory is completed.

It is desirable for the multifocal optical system to include a bifocal optical system having at least one immovable lens group and a movable lens group which is moved by the drive controller with respect to the immovable lens group.

With this arrangement, the lens structure and its surrounding mechanism can be simplified.

The present disclosure relates to subject matter contained in Japanese Patent Application No. 2004-253385 (filed on Aug. 31, 2004) which is expressly incorporated herein in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
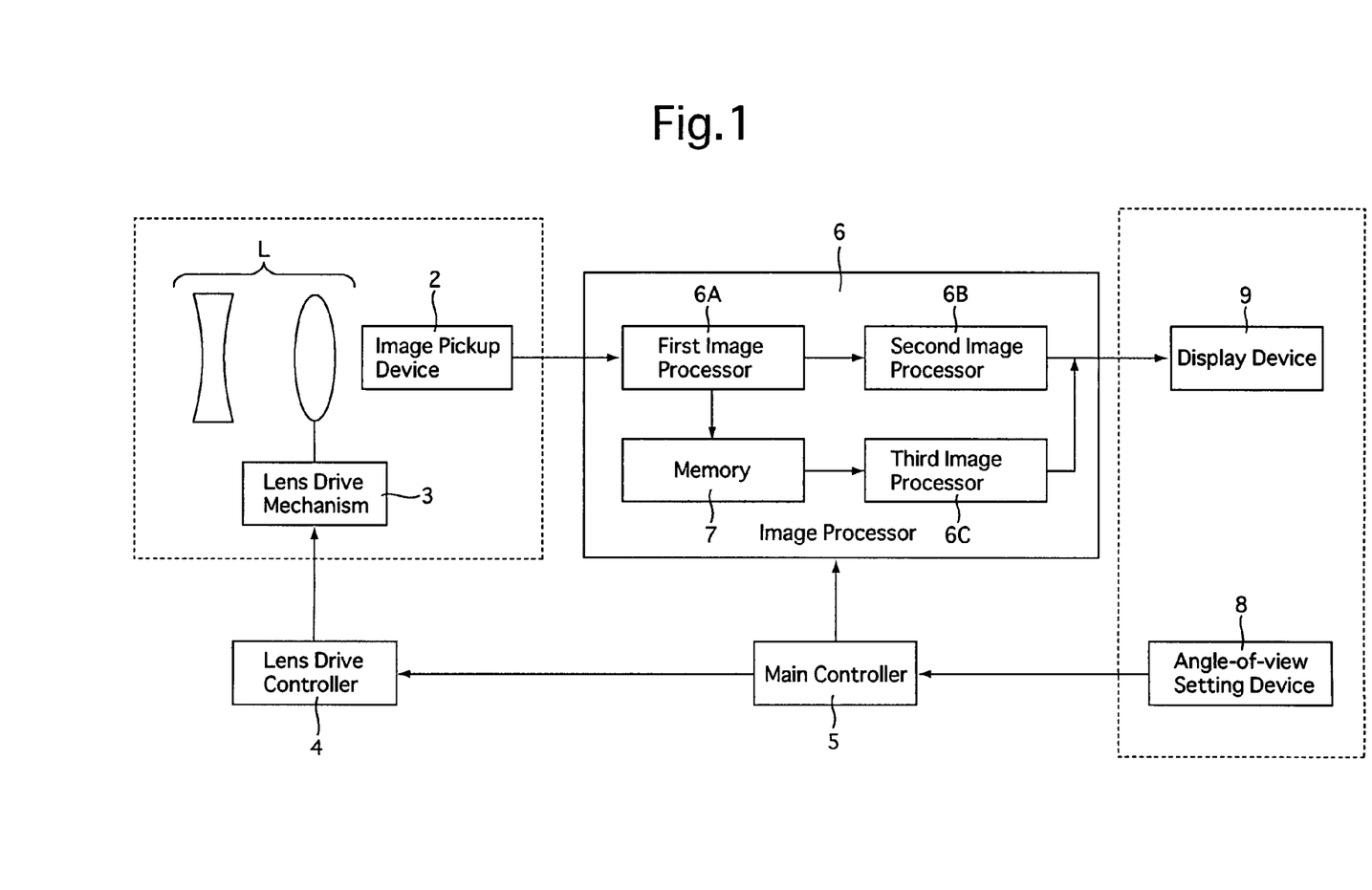
FIG. 1 is a block diagram of main components of an image pickup apparatus according to an embodiment of the present invention.

FIG. 1 shows a block diagram of main components of an image pickup apparatus according an embodiment of the present invention. The image pickup apparatus of present invention includes a multifocal optical system L, an image pickup device (CCD) 2, a lens drive mechanism 3, a lens drive controller 4, a main controller 5, an image processor 6, a angle-of-view setting device 8 and a display device 9.

Figure 2:
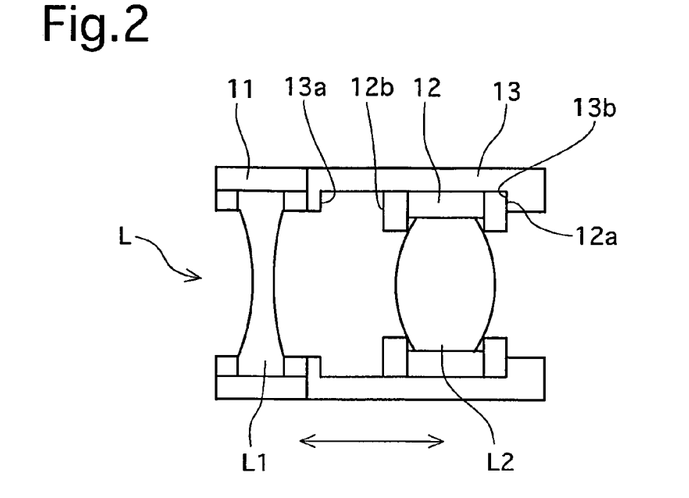
FIG. 2 is a schematic view of a multifocal optical system shown in FIG. 1.

The multifocal optical system L is in the form of a bifocal lens system, in which one of a first focal length fs on the short focal length side and a second focal length ft on the long focal length side can be optically selected. The multifocal optical system L includes at least one immovable lens group L1 and a movable lens group L2 which is movable relative to the immovable lens group L1, in that order from the object side, as shown in FIG. 2. The immovable lens group L1 is supported by a support frame 11 secured in the apparatus. The movable lens group L2 is supported by a support frame 12 supported by the stationary frame 13. The stationary frame 13 is secured to the support frame 11 which supports the immovable lens group L1. The stationary frame 13 is provided with a guide groove (not shown) in which the support frame 12 of the movable lens group L2 is supported so as to move in a direction of the optical axis of the immovable lens group L1. Although the support frame 11 and the stationary frame 13 are separate members in the illustrated embodiment, it is possible to integrally form the support frame 11 and the stationary support frame 13 together. If the support frames 11 and the stationary frame 13 are integrally formed, assembling error can be reduced.

The movable lens group L2 is moved by the lens drive mechanism 3 and the lens drive controller 4 between a short focal length extremity W in which the movable lens group L2 is far away from the immovable lens group L1 and one end 12a of the support frame 12 abuts against a short focal length end (restriction device) 13a of the stationary frame 13 (as shown in FIG. 2), and a long focal length extremity T in which the movable lens group L2 is moved close to the immovable lens group L1 and the other end 12b of the support frame 12 abuts against a long focal length end (restriction device) 13b of the stationary frame 13. The movement of the movable lens group L2 is restricted when the support frame 12 abuts against the stationary frame 13. Therefore, it is possible to prevent deterioration in optical performance caused by decentering (eccentricity), etc. Thus, the focal lengths of the multifocal optical system L can be selected with high precision. The multifocal optical system L is at the first focal length fs when the movable lens group L2 is located at the short focal length extremity W and is at the second focal length ft when the movable lens group L2 is located at the long focal length extremity T, respectively.

The image pickup device 2 converts an optical image of an object formed by the multifocal optical system L into a digital image and outputs the corresponding image signal to the image processor 6. The image processor 6 includes a first image processor 6A, a second image processor 6B, a third image processor 6C and a memory 7. The first image processor 6A receives the image signal from the image pickup device 2, carries out the image processing operations and produces an object image which can be displayed in the display device 9. The second image processor 6B trims the object image formed by the first image processor 6A, in accordance with the set angle-of-view of the angle-of-view setting device 8 to form a trimmed image. The object image formed by the first image processor 6A is stored in the memory 7. The third image processor 6C reads the object image stored in the memory 7 and trims the object image in accordance with the set angle-of-view of the angle-of-view setting device 8 to thereby form a trimmed image. The trimmed images formed by the second image processor 6B and the third image processor 6C are output to the display device 9. The second image processor 6B and the third image processor 6C constitute a trimming device.

The angle-of-view setting device 8 includes an operation member to set and vary the angle of view of the trimmed images (digital zoom images) formed by the image processor 6. When the angle-of-view setting device 8 is actuated by an operator (user) to perform wide-angle zooming, the angle-of-view is continuously varied from the wide-angle side toward the telephoto side. Conversely, when the angle-of-view setting device 8 is actuated by an operator to perform telephoto zooming, the angle-of-view is continuously varied from the telephoto side to the wide-angle side. The angle-of-view which can be set by the angle-of-view setting device 8 includes the angle-of-views f1 and f2, corresponding to the first focal length fs and the second focal length ft of the multifocal optical system L, respectively.

The lens drive controller 4, the image processor 6 and the angle-of-view setting device 8 are connected to the main controller 5. The main controller 5 operates the lens drive controller 4 and the image processor 6 in accordance with the angle-of-view set by the angle-of-view setting device 8 and indicates the trimmed image at the set angle-of-view in the display device 9.

Figure 3:
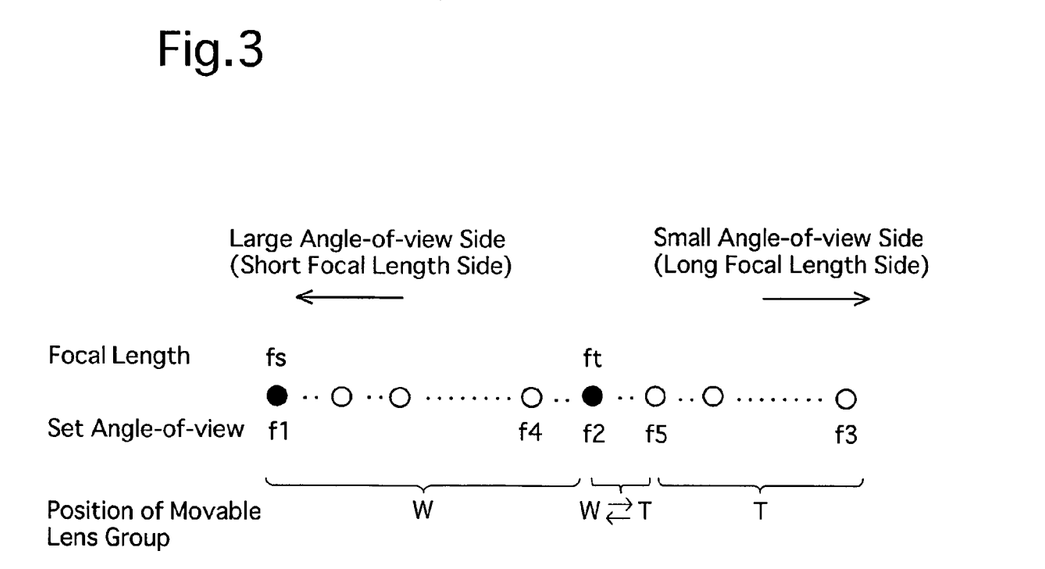
FIG. 3 is a conceptual view of an optical zooming operation and a trimming operation in combination.

FIG. 3 schematically shows a relationship of the position of the movable lens group L2 of the multifocal optical system L, the angle-of-views f (f1 through f5) which can be set by the angle-of-view setting device 8, and the trimmed images obtained at the respective set angle-of-views f1 through f5. In FIG. 3, the angle-of-views f1 and f2 indicated by black circles represent the angle-of-views corresponding to the first focal length fs and the second focal length ft of the multifocal optical system L, respectively. The angle-of-views f3, f4 and f5 indicated by white circles represent zoom positions. The selectable angle-of-views f1 through f5 satisfy the relationship defined by f1>f4>f2>f5>f3. The angle-of-views vary stepwise and the angle-of-view f3 corresponds to the selectable maximum zoom position.

It is assumed in the following discussion that the zooming (wide-angle zooming) is carried out from the smallest angle-of-view f3 to the largest angle-of-view f1.

When the smallest angle-of-view f3 is set by the angle-of-view setting device 8, the movable lens group L2 of the multifocal optical system L is located at the long focal length extremity T. The focal length of the multifocal optical system L is identical to the second focal length ft. In this position, if the angle-of-view setting device 8 is operated to perform a wide-angle zooming operation, the lens position of the movable lens group L2 is maintained at the long focal length extremity T until the set angle-of-view f becomes the angle-of-view f5, which is smaller than the angle-of-view f2 by one step, corresponding to the second focal length ft. Consequently, the focal length of the multifocal optical system L remains unchanged at the second focal length ft. The trimmed image $I_{Dm}$ (ft) corresponding to the set angle-of-view f based on the original image defined by the object image I(ft) at the second focal length ft is displayed in the display device 9. Once the set angle-of-view f becomes the angle-of-view f5, the movable lens group L2 is moved from the long focal length extremity T to the short focal length extremity W while the angle-of-view is switched from f5 to f2. Consequently, the focal length of the multifocal optical system L is changed from the second focal length ft to the first focal length fs. During the switching of the focal length, the trimmed image $I_{Dm}$(ft) corresponding to the set angle-of-view f based on the original image defined by the object image Im(ft) at the second focal length ft, stored in the memory 7 when the angle-of-view becomes f5, is displayed in the display device 9. Consequently, the zooming effect can be continuously achieved during the switching of the focal length. The lens position of the movable lens group L2 is maintained at the short focal length extremity W in the angle range from the angle-of-view f2 to the angle-of-view f1 after the focal length has been switched. Therefore, the focal length of the multifocal optical system L remains unchanged at the first focal length fs. The trimmed image $I_{Dm}$(fs) corresponding to the set angle-of-view, based on the original image defined by the object image I(fs) at the first focal length fs is displayed in the display device 9.

In the following discussion, it is assumed that the zooming (telephoto zooming) from the largest angle-of-view f1 to the smallest angle-of-view f3 is carried out.

When the largest angle-of-view f1 is set, the movable lens group L2 of the multifocal optical system L is located at the short focal length extremity W. The focal length of the multifocal optical system L is identical to the first focal length fs. In this position, if the angle-of-view setting device 8 is operated to perform a telephoto zooming operation, the lens position of the movable lens group L2 is maintained at the short focal length extremity W until the set angle-of-view f becomes the angle-of-view f2 corresponding to the second focal length ft. Consequently, the focal length of the multifocal optical system L remains unchanged at the first focal length fs. The trimmed image $I_{Dm}$ (fs) corresponding to the set angle-of-view f, based on the original image defined by the object image I(fs) at the first focal length ft, is displayed in the display device 9. Once the set angle-of-view f becomes the angle-of-view f2, the movable lens group L2 is moved from the short focal length extremity W to the long focal length extremity T while the angle-of-view is varied from f2 to f5 which is smaller than f2 by one step. Consequently, the focal length of the multifocal optical system L is changed from the first focal length fs to the second focal length ft. During the switching of the focal length, the trimmed image $I_{Dm}$(fS) corresponding to the set angle-of-view f based on the original image defined by the object image Im(fs) at the first focal length fs, stored in the memory 7 when the angle-of-view becomes f2, is displayed in the display device 9. Consequently, the zooming effect can be continuously achieved during variation of the focal length. The lens position of the movable lens group L2 is maintained at the long focal length extremity T in the angle range from the angle-of-view f5 to the angle-of-view f3 after the focal length has been switched. Therefore, the focal length of the multifocal optical system L remains unchanged at the second focal length ft. The trimmed image $I_{Dm}$(ft) corresponding to the set angle-of-view, based on the original image defined by the object image I(ft) at the second focal length ft, is displayed in the display device 9.

The operation of the image pickup apparatus of the present invention will be discussed below with reference to a flow chart shown in FIGS. 4A, 4B, 4C and 4D. The operation of the image pickup apparatus is controlled by the main controller 5. The main controller 5 detects the current position of the movable lens group L2 of the multifocal optical system L and the angle-of-view f set by the angle-of-view setting device 8 (step S1), and performs a control operation corresponding to the set angle-of-view f.

Figure 4A:
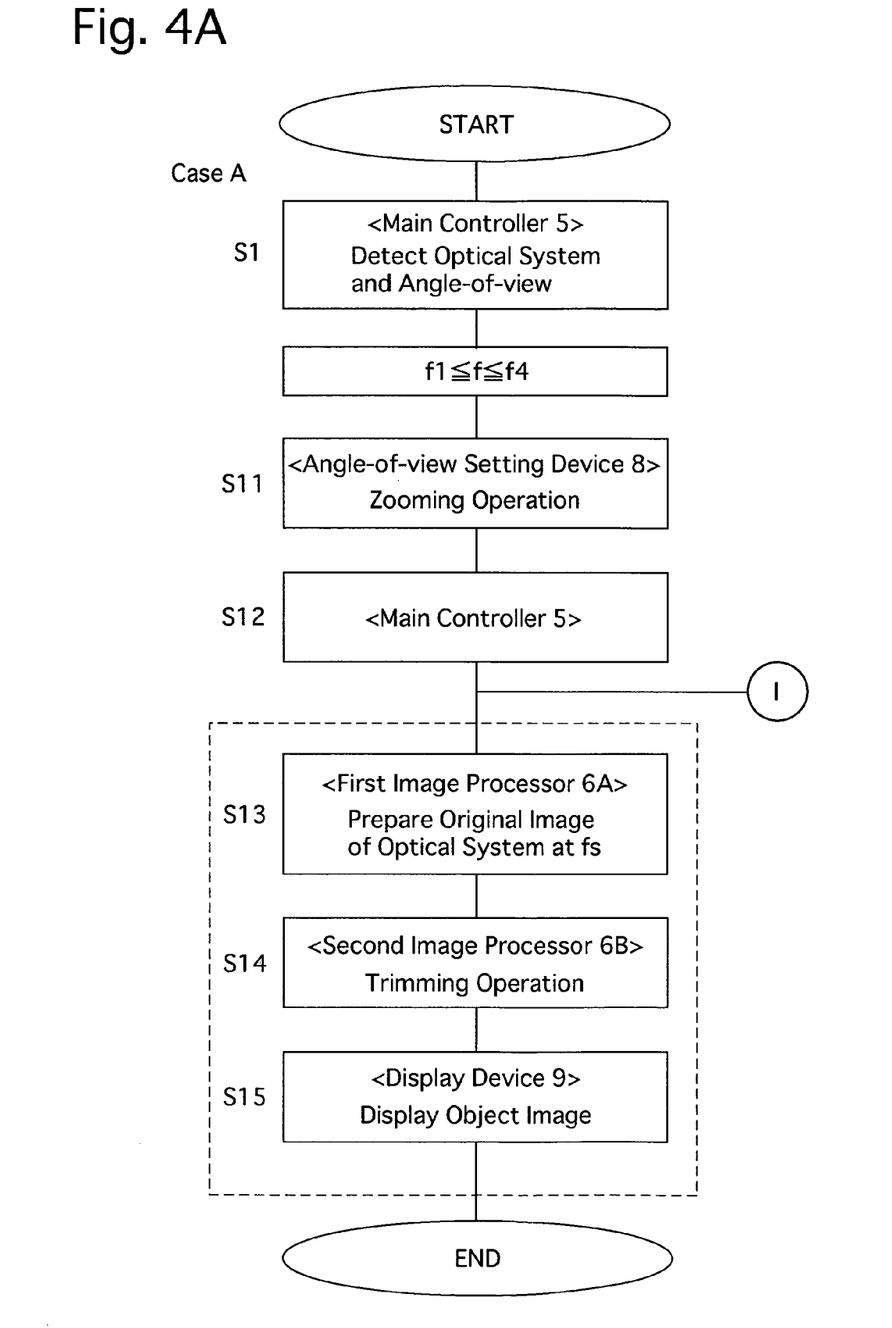
FIGS. 4A, 4B, 4C and 4D show a flow chart of an operation of a trimming image pickup apparatus shown in FIG. 1.

Case A. (f1≦f≦f4)

If the currently set angle-of-view f satisfies f1≦f≦f4, when the multifocal optical system L is operated to perform a zooming operation (step S11), the main controller 5 receives the signal from the angle-of-view setting device 8 (step S12), and the main controller 5 drives the first image processor 6A and the second image processor 6B (step S13 and step S14). The zooming operation at step S11 may be either the telephoto zooming operation or the wide-angle zooming operation. The first image processor 6A at step S13 carries out various image processing operations in response to the image signal received from the image pickup device 2 to form an object image I(fs) at the first focal length fs of the multifocal optical system L and outputs the object image I(fs) to the second image processor 6B. At step S14, the second image processor 6B trims the object image I(fs) input from the first image processor 6A to form a trimmed image $I_{Dm}$(fs) of the trimming ratio Dm corresponding to the current angle-of-view f. The trimmed image $I_{Dm}$(fs) formed by the second image processor 6B is displayed in the display device 9 (step S15). The trimming ratio Dm is defined as Dm=(f/f1), because the original image is defined by the object image I(fs) at the first focal length fs. If the current set angle-of-view f is identical to the angle-of-view f1 corresponding to the first focal length fs of the multifocal optical system L (fs=f1), the trimming ratio Dm is 1, i.e., Dm=(f1/fs)=1. If the trimming ratio Dm is equal to 1, the trimmed image $I_{Dm}$(fs) formed by the second image processor 6B is identical to the object image I(fs) formed by the first image processor 6A.

Figure 4B:
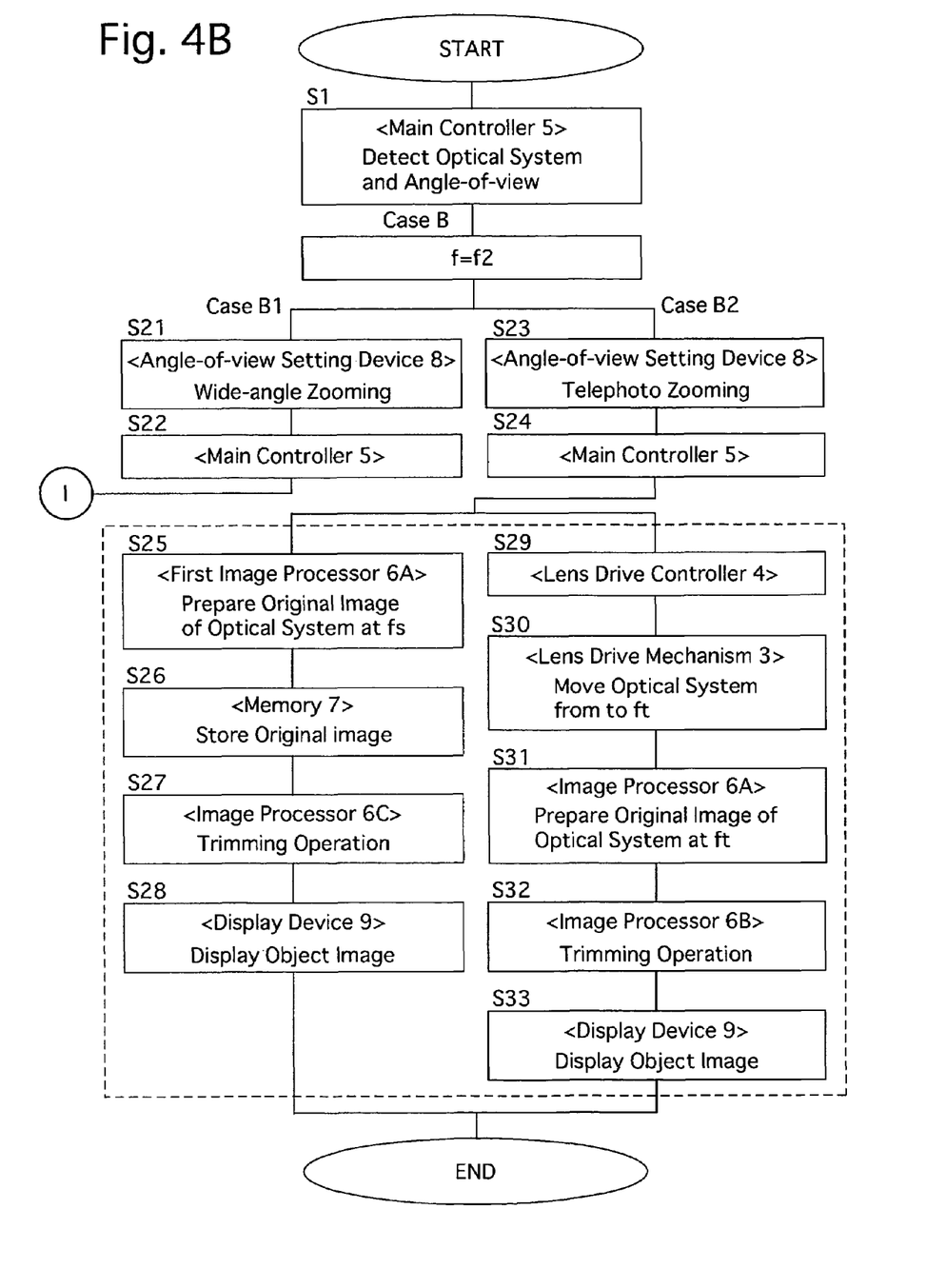

Case B. (f=f2)

If the current set angle-of-view f is identical to the angle-of-view f2 corresponding to the second focal length ft of the multifocal optical system L, when the angle-of-view setting device 8 is operated for wide-zooming (S21) (case B1), the main controller 5 receives the signal from the angle-of-view setting device 8 (step S22), and the main controller 5 drives the first image processor 6A and the second image processor 6B (step S13, step S14), as in the above-mentioned case of (f1≦f≦f4). The trimmed image formed by the second image processor 6B is displayed in the display device 9 (step S15).

When the angle-of-view setting device 8 is operated for telephoto zooming (step S23) (case B2), the main controller 5 receives the signal from the angle-of-view setting device 8 (step S24), and the main controller 5 drives the image processor 6 (steps S25 through S27) and the lens drive controller 4 (steps S29 through step S32). At step S25, the first image processor 6A forms an object image I(fs) at the first focal length fs of the multifocal optical system L and outputs the object image I(fs) to the memory 7. The memory 7 stores the object image I(fs) at the first focal length fs input from the first image processor 6A (step S26). In order to distinguish from the object images I(fs) and I(ft) formed by the first image processor 6A, the object images stored in the memory 7 will be hereinafter referred to as Im(fs) and Im(ft), respectively. Upon completion of storing the images in the memory 7, the parallel operations by the third image processor 6C and the lens drive controller 4 are carried out.

The third image processor 6C reads the object image Im(fs) stored in the memory 7 and trims the object image Im(fs) to form a trimmed image $I_{Dm}$(fs) at the trimming ratio Dm corresponding to the current set angle-of-view f (step S27). Consequently, the trimmed image $I_{Dm}$(fs) formed by the third image processor 6C is displayed in the display device 9 (step S28). The lens drive controller 4 moves the movable lens group L2 of the multifocal optical system L to the long focal length extremity T via the lens drive mechanism 3 (step S29 and step S30). As a result, the focal length of the multifocal optical system L is switched from the first focal length fs to the second focal length ft. Upon completion of the switching of the focal length of the multifocal optical system L, the first image processor 6A forms an object image I(ft) at the second focal length ft of the multifocal optical system L and supplies the object image I(ft) to the second image processor 6B (step S31). The second image processor 6B trims the object image I(ft) supplied from the first image processor 6A to form a trimmed image $I_{Dm}$(ft) of the trimming ratio Dm corresponding to the current set angle-of-view f and outputs the trimmed image $I_{Dm}$(ft) to the display device 9 (step S32). When the trimmed image $I_{Dm}$(ft) output from the second image processor 6B is input to the display device 9, the display device 9 indicates the trimmed image $I_{Dm}$(ft) supplied from the second image processor 6B in place of the trimmed image $I_{Dm}$(fs) supplied from the third image processor 6C (step S33).

At step S31, the trimming ratio Dm is given by Dm=(f/f1), because the original image is defined by the object image I(ft) at the second focal length ft. If the current set angle-of-view f is identical to the angle-of-view f2 corresponding to the second focal length ft of the multifocal optical system L (ft=f2), the trimming ratio Dm is 1, i.e., Dm=(f2/ft)=1. If the trimming ratio Dm is equal to 1, the trimmed image $I_{Dm}$(fS) formed by the second image processor 6B is identical to the object image I(ft) formed by the first image processor 6A.

Figure 4C:
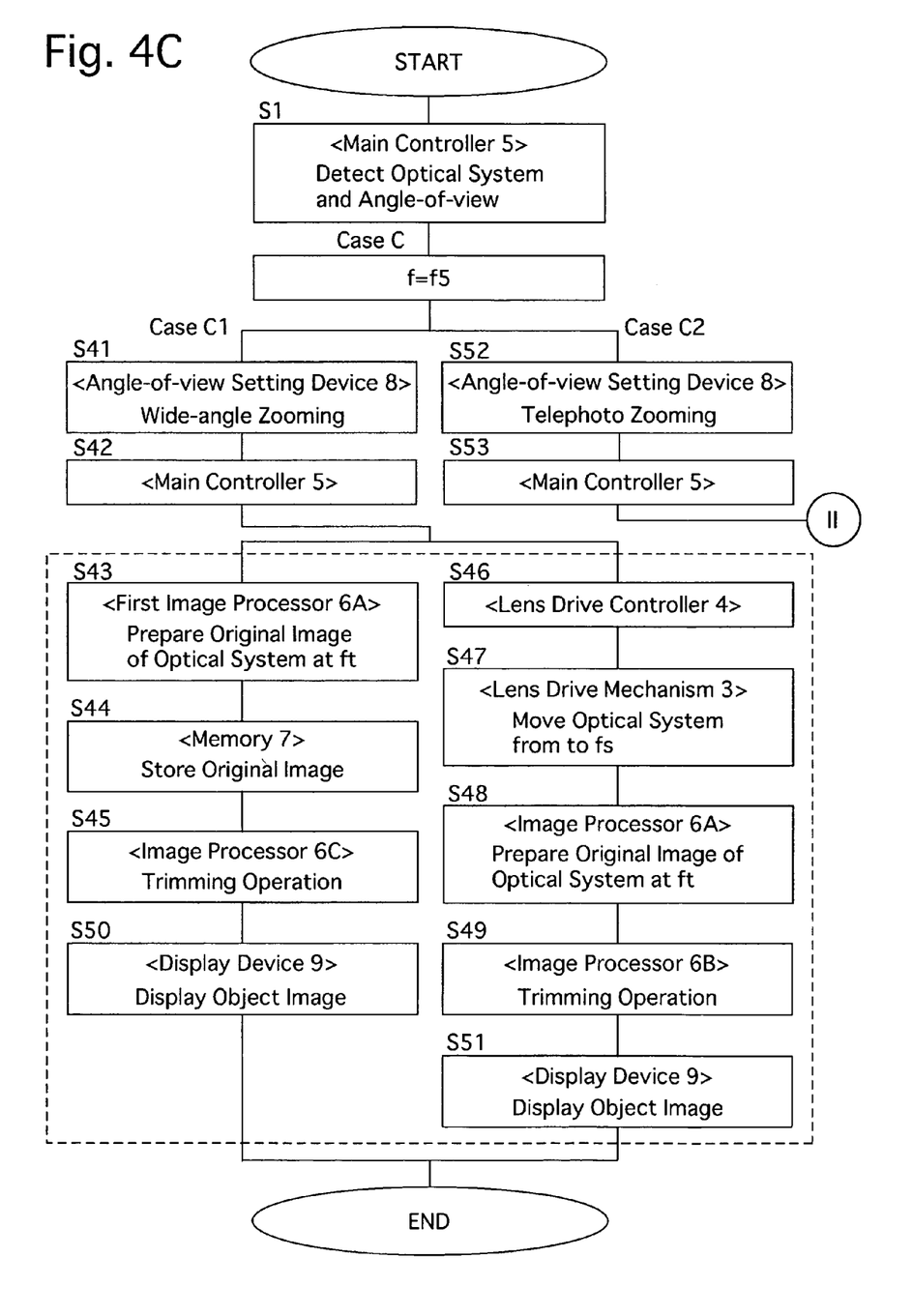

Case C. (f=f5)

If the current set angle-of-view f is identical to the angle-of-view f2 corresponding to the second focal length ft of the multifocal optical system L, when the angle-of-view setting device 8 is operated for wide-angle zooming (step S41) (case C1), the main controller 5 receives the signal from the angle-of-view setting device 8 (step S42), and the main controller 5 drives the image processor 6 and the lens drive controller 4 (steps S43 through step S49). At step S43, the first image processor 6A forms an object image I(ft) at the second focal length ft of the multifocal optical system L. The object image I(ft) formed by the first image processor 6A is stored in the memory 7 which outputs the object image I(ft) to the third image processor 6C (step S44). The third image processor 6C trims the object image I(ft) input thereto to form a trimmed image $I_{Dm}$(ft) of the trimming ratio Dm corresponding to the current set angle-of-view f (step S45). The trimmed image $I_{Dm}$(ft) is sent to the display device 9 via the third image processor 6C and is displayed in the display device 9 (step S50). The lens drive controller 4 operates in parallel with the operation of the third image processor 6C (step S46) and moves the movable lens group L2 of the multifocal optical system L to the short focal length extremity W via the lens drive mechanism 3 (step S47). Consequently, the focal length of the multifocal optical system L is switched from second focal length ft to the first focal length fs. Upon completion of the switching of the focal length of the multifocal optical system L by the lens drive controller 4, the first image processor 6A forms an object image I(fs) at the first focal length fs of the multifocal optical system L and outputs the object image I(fs) to the second image processor 6B (step S48). The second image processor 6B trims the object image I(fs) at the first focal length fs to form a trimmed image $I_{Dm}$(fs) of the trimming ratio Dm corresponding to the current set angle-of-view f (step S49). The trimmed image $I_{Dm}$(fs) is displayed in the display device 9. When the trimmed image $I_{Dm}$(fs) output from the second image processor 6B is input to the display device 9, the display device 9 indicates the trimmed image $I_{Dm}$(fs) formed by the second image processor 6B in place of the trimmed image $I_{Dm}$(ft) formed by the third image processor 6C (step S51).

When the angle-of-view setting device 8 is operated for telephoto zooming (step S52)(case C2), the main controller 5 receives the signal from the angle-of-view setting device 8 (step S53), and the main controller 5 drives the image processor 6 (step S63 through step S65). At step S63, the first image processor 6A forms an object image I(ft) at the second focal length ft of the multifocal optical system L and outputs the object image I(ft) to the second image processor 6B. The second image processor 6B trims the object image I(ft) at the second focal length ft to form a trimmed image $I_{Dm}$(ft) of the trimming ratio Dm corresponding to the current set angle-of-view f and outputs the trimmed image $I_{Dm}$(ft) to the display device 9 (step S64). The trimmed image $I_{Dm}$(ft) formed by the second image processor 6B is displayed in the display device 9 (step S65).

Figure 4D:
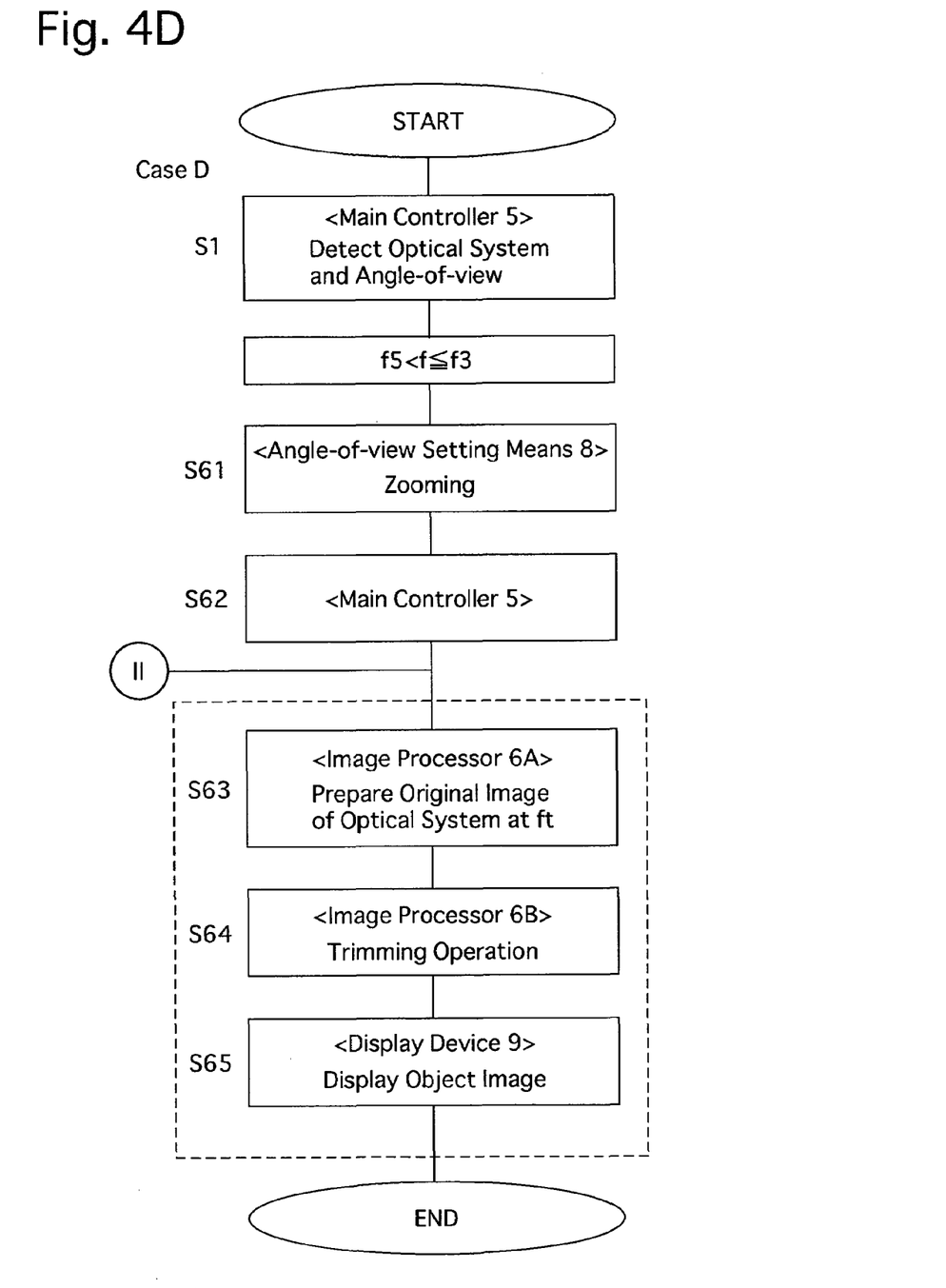

Case D. (f5<f≦f3)

If the current set angle-of-view f satisfies f5<f≦f3, when the multifocal optical system L is operated for zooming (step S61), the main controller 5 receives the signal from the angle-of-view setting device 8 (step S62), and the main controller 5 drives the first image processor 6A and the second image processor 6B (step S63, step S64). As mentioned above, the first image processor 6A at step S63 forms an object image I(ft) at the second focal length ft of the multifocal optical system L. At step S64, the second image processor 6B trims the object image I(ft) to form a trimmed image $I_{Dm}$(ft) of the trimming ratio Dm corresponding to the current set angle-of-view f. The trimmed image $I_{Dm}$(ft) formed by the second image processor 6B is displayed in the display device 9 (step S65).

As can be understood from the above discussion, according to the present invention, the focal length of the multifocal optical system L is switched between the angle-of-view f2 and the angle-of-view f5, which is smaller than the angle-of-view f2 by one step. During switching of the focal length, the trimmed image formed using the original image defined by the object image at the previous focal length (i.e., the second focal length in the case of wide-angle zooming and the first focal length fs in the case of telephoto zooming) is displayed in the display device 9. Accordingly, an continuous zooming effect can be obtained during the switching the focal length of the multifocal optical system L.

In the illustrated embodiment, since the object image at a focal length between the first focal length fs and the second focal length ft, of the multifocal optical system L is complemented by a trimmed image, the lens structure of the multifocal optical system L and the mechanical structure of the surrounding mechanism thereof can be simplified, thus leading to reduction in size and weight of the image pickup apparatus, while achieving a zoom effect substantially the same as that of a conventional optical zoom lens system. Moreover, since the original image for the trimmed image is appropriately selected in accordance with the set angle-of-view f, the image quality is less deteriorated due to the trimming operation, compared with the trimming using a unifocal lens system.

Although the bifocal lens having two different switchable focal lengths is used for the multifocal optical system L in the illustrated embodiment, it is possible to use a multifocal optical system having three or more different focal lengths. If the bifocal lens system is used as in the illustrated embodiment, the lens structure and the surrounding mechanism thereof (drive system, etc.) can be significantly simplified.

Furthermore, in a zoom lens system which includes a focal length range between the wide-angle extremity and the telephoto extremity which has an optically discontinuous portion (i.e., does not have a solution), the present invention can be applied so as to connect this discontinuous portion to provide a continuous zooming path.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An image pickup apparatus comprising:
    a multifocal optical system in which at least a first focal length on a short focal length side and a second focal length on a long focal length side is optically selected;
    an image pickup device for converting an optical image formed by said multifocal optical system into an image signal;
    an image processor which processes said image signal output from said image pickup device, and forms an original image which is defined by an object image of an angle-of-view corresponding to said first and second focal lengths of said multifocal optical system;
    a trimming device for trimming said original image formed by said image processor to form trimmed images of angle-of-views smaller than first and second angle-of-views which correspond to said first and second focal lengths, respectively;
    a drive controller for switching the optical focal length of said multifocal optical system when the set angle-of-view of said trimming device changes between said second angle-of-view and a third angle-of-view which is smaller than said second angle-of-view; and
    a memory for storing an original image formed by said image processor at a focal length before said optical focal length is switched by said drive controller,
    wherein said trimming device forms trimmed images corresponding to set angle-of-views, using the original image stored in said memory, while the optical focal length of said multifocal optical system is switched.

2. The image pickup apparatus according to claim 1, wherein said trimming device trims the original image of an angle-of-view corresponding to said first focal length so as to thereby form a trimmed image whose angle-of-view is between said first angle-of-view and a angle-of-view smaller than said second angle-of-view.

3. The image pickup apparatus according to claim 1, wherein when the set angle-of-view of the trimming device is larger than said second angle-of-view, said multifocal optical system is maintained at said first focal length, and when the set angle-of-view of said trimming device is smaller than a third angle-of-view which is smaller than said second angle-of-view, said multifocal optical system is maintained at said second focal length.

4. The image pickup apparatus according to claim 3, wherein while the set angle-of-view of said trimming device increases from one of said third angle-of-view and an angle-of-view smaller than said third angle-of-view, said memory stores the original image of said second angle-of-view when said set angle-of-view is equal to said third angle-of-view, and said multifocal optical system switches from said second focal length to said first focal length via said drive controller while said set angle-of-view is between said third angle-of-view and said second angle-of-view.

5. The image pickup apparatus according to claim 4, wherein said original image is replaced with an object image of said first angle-of-view corresponding to said first focal length, and said trimming device forms a trimmed image corresponding to said set angle-of-view, when a switching of the optical focal length of said multifocal optical system by said drive controller is completed.

6. The image pickup apparatus according to claim 1, wherein while the set angle-of-view of said trimming device is reduced from one of said second angle-of-view and an angle-of-view larger than said second angle-of-view, said memory stores the original image of said first angle-of-view when said set angle-of-view is equal to said second angle-of-view, and said multifocal optical system switches from said first focal length to said second focal length via said drive controller while said set angle-of-view is between said second angle-of-view and said third angle-of-view.

7. The image pickup apparatus according to claim 6, wherein said original image is replaced with an object image of said second angle-of-view, and said trimming device forms a trimmed image corresponding to said set angle-of-view, when a switching of said optical focal length of said multifocal optical system by said drive controller is completed.

8. The image pickup apparatus according to claim 1, wherein said drive controller causes said multifocal optical system to begin switching the focal length when the storage operation of said memory is completed.

9. The image pickup apparatus according to claim 1, wherein said multifocal optical system comprises a bifocal optical system having at least one immovable lens group and a movable lens group which is moved by said drive controller with respect to the immovable lens group.

* * * * *